United States Patent [19]
Shimizu et al.

[11] Patent Number: 5,554,891
[45] Date of Patent: Sep. 10, 1996

[54] ANTITHEFT DEVICE FOR A VEHICLE

[75] Inventors: Hidekazu Shimizu; Akihiro Hashimoto, both of Hamakita, Japan

[73] Assignee: Asahi Denso Kabushiki Kaisha, Japan

[21] Appl. No.: 218,569

[22] Filed: Mar. 28, 1994

[30] Foreign Application Priority Data

Mar. 30, 1993 [JP] Japan .................. 5-097206
Sep. 30, 1993 [JP] Japan .................. 5-269683

[51] Int. Cl.⁶ ............................. B60R 25/04
[52] U.S. Cl. .............. 307/10.2; 307/10.3; 307/10.6; 364/424.01; 180/287; 123/198 DC; 340/426
[58] Field of Search .................. 307/9.1–10.8; 123/198 B, 198 DB, 198 DC; 340/425.5, 426, 428, 441, 825.31, 825.34, 825.69, 825.72; 361/171; 364/424.01, 424.05; 180/287

[56] References Cited

U.S. PATENT DOCUMENTS

| | | | |
|---|---|---|---|
| 3,559,757 | 2/1971 | Weiss | 307/10.2 |
| 3,634,697 | 1/1972 | MacFarlane | 307/10.2 |
| 3,947,693 | 3/1976 | Eskenas | 307/10.2 |
| 4,233,950 | 11/1980 | Kroiski et al. | 123/119 D |
| 4,418,330 | 11/1983 | Kamichik | 180/287 |
| 4,449,605 | 5/1984 | Read | 180/287 |
| 4,719,896 | 1/1988 | Nakayama | 123/599 |
| 4,749,873 | 6/1988 | Mutoh et al. | 307/10.2 |
| 4,803,460 | 2/1989 | Rhee et al. | 340/428 |
| 4,835,407 | 5/1989 | Kataoka et al. | 307/10.5 |
| 4,888,575 | 12/1989 | De Vaulx | 340/426 |
| 4,991,683 | 2/1991 | Garretto | 307/10.4 |
| 5,079,435 | 1/1992 | Tanaka | 307/10.2 |
| 5,079,436 | 1/1992 | Elkins | 307/10.2 |
| 5,091,586 | 2/1992 | Hasegawa et al. | 180/287 |
| 5,124,565 | 6/1992 | Yosida | 307/10.3 |
| 5,222,468 | 6/1993 | Korenaga | 180/287 |
| 5,394,327 | 2/1995 | Simon, Jr. et al. | 364/424.01 |

FOREIGN PATENT DOCUMENTS

| | | |
|---|---|---|
| 0475800A1 | 3/1992 | European Pat. Off. . |
| 0582482A1 | 2/1994 | European Pat. Off. . |
| 4228864A1 | 3/1994 | Germany . |
| 55-44071 | 3/1980 | Japan . |
| 59-45837 | 11/1984 | Japan . |
| 61-40577 | 10/1986 | Japan . |
| 63-43860 | 3/1988 | Japan . |
| 3-121953 | 5/1991 | Japan . |
| WO94/08823 | 4/1994 | WIPO . |

Primary Examiner—William M. Shoop, Jr.
Assistant Examiner—Peter Ganjoo
Attorney, Agent, or Firm—Harness, Dickey & Pierce, P.L.C.

[57] ABSTRACT

An antitheft device for a vehicle such as a motorcycle or an automobile for preventing theft of the vehicle by controlling the ignition system of the vehicle. The antitheft device includes a power supply, an ignition device for starting the vehicle's engine, an ignition switch having a switch mechanism for opening and closing a power circuit between the power supply and ignition device and an antitheft unit. The ignition switch includes a mechanical locking mechanism for selectively preventing the normal steering operation of the vehicle as well as sensors for detecting the removal or destruction of the switch mechanism or the mechanical locking mechanism. The antitheft unit causes a first disablement condition in response to an input signal where at least a part of the ignition device is disabled and causes a second disablement condition in response to the detection of an abnormality by the sensors where at least a part of the ignition device is disabled. The ignition device being incorporated into the antitheft unit.

26 Claims, 7 Drawing Sheets

ANTITHEFT DEVICE FOR A VEHICLE

BACKGROUND OF THE INVENTION

The present invention relates to an antitheft device for preventing the theft of a vehicle by disabling the ignition system of the vehicle.

There exists a wide variety of devices for preventing the theft of a vehicle, particularly by disabling the vehicle's ignition system. One vehicle antitheft device of this type is taught in Japanese Patent Publication No. 40577/1986. The device taught in this publication includes a mechanical steering lock mechanism which prevents the normal steering operation of the vehicle when the key has been pulled out from the ignition. The device operates by closing a switching element when the steering lock mechanism is destroyed or removed from the vehicle. A fuse is connected between a power supply and the ignition, with one end of the switching element grounded and the other end connected to a position between the fuse and the ignition means. The device prevents starting the engine when the steering lock mechanism has been destroyed or removed from the body of the vehicle by using the electric current from the power supply to blow out the fuse and thereby disable the ignition system.

However this antitheft device has several inherent drawbacks, the most notable being that it is possible to operate the ignition and start the engine of the vehicle by replacing the burnt out fuse with a new one, or by otherwise connecting the broken circuit using an appropriate conducting member. Since a vehicle may be equipped with extra fuses and such fuse replacement can be easily carried out by even those not skilled in the electrical art, this type of antitheft device does not always prevent an unauthorized person from starting the engine.

It is therefore an object of the present invention to provide an antitheft device which inhibits such reconnection of a broken circuit caused by destruction or removal of the steering lock mechanism and which may also aid recovery of a stolen vehicle equipped with this device.

SUMMARY OF THE INVENTION

For achieving this object, there is provided, according to the present invention, an antitheft device for a vehicle which includes a power supply, an ignition device which facilitates starting the vehicle's engine, an ignition switch having a switch mechanism for opening and closing a power circuit between the power supply and the ignition device and an antitheft unit. The ignition switch includes a mechanical locking means for selectively preventing the normal steering operation of the vehicle as well as sensors for detecting the removal or destruction of the switch mechanism or the mechanical locking means. The antitheft unit includes means for receiving an input signal and, responsive to signals output by said sensors and to the input signal, controls the operation of the ignition switch. The ignition device can thus be disabled by controlling the switch mechanism to open the power circuit between the power supply and the ignition device.

BRIEF DESCRIPTION OF THE DRAWINGS

Other objects and advantages of the present invention will become apparent from the following detailed description of a preferred embodiment of the present invention taken in reference to the accompanying drawings in which.

DESCRIPTION OF THE PREFERRED EMBODIMENTS

Figure 1:
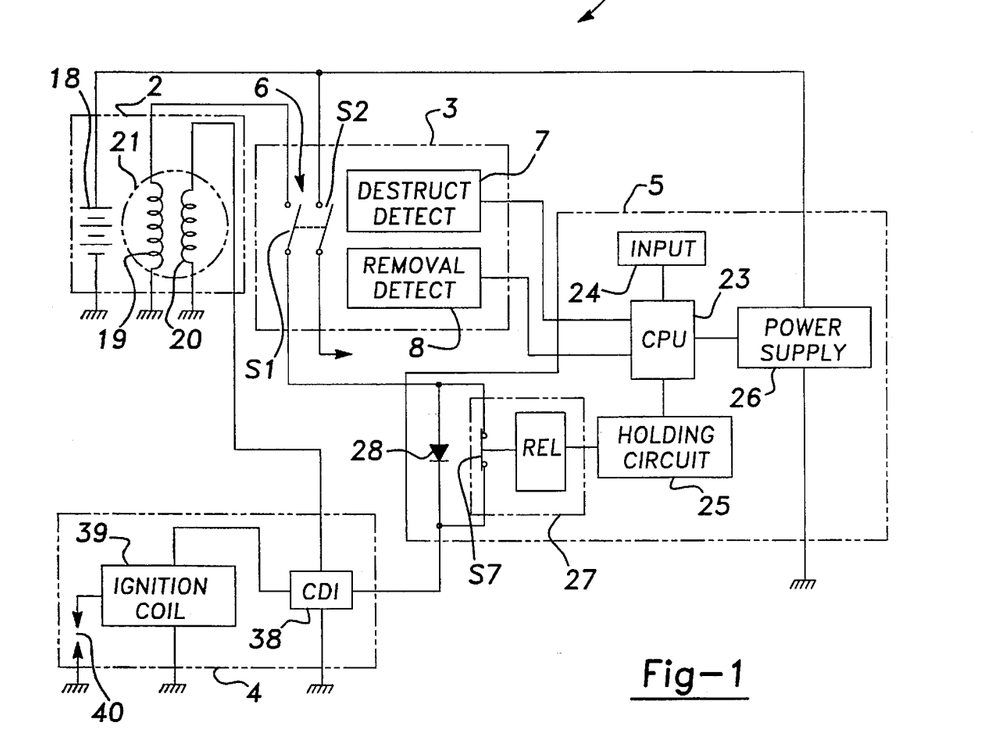
FIG. 1 is a block diagram illustrating a first preferred embodiment of an antitheft device according to the teachings of the present invention.

Preferred embodiments of the vehicle antitheft device of the present invention will be hereinafter described with reference to the accompanying drawings in which FIG. 1 is a block diagram which illustrates one preferred embodiment of the antitheft device of the present invention. As shown in FIG. 1, the antitheft device 1 includes four main interconnected components, a power supply 2, an ignition switch 3, an ignition device 4 and an antitheft unit 5. The ignition switch 3 includes a switch mechanism 6 having contacts S1 and S2, a destruction detecting sensor 7 for detecting the destruction of the ignition switch 3 and a removal detecting sensor 8 for detecting the removal of the ignition switch 3 from the body of the vehicle.

Figures 2, 3:
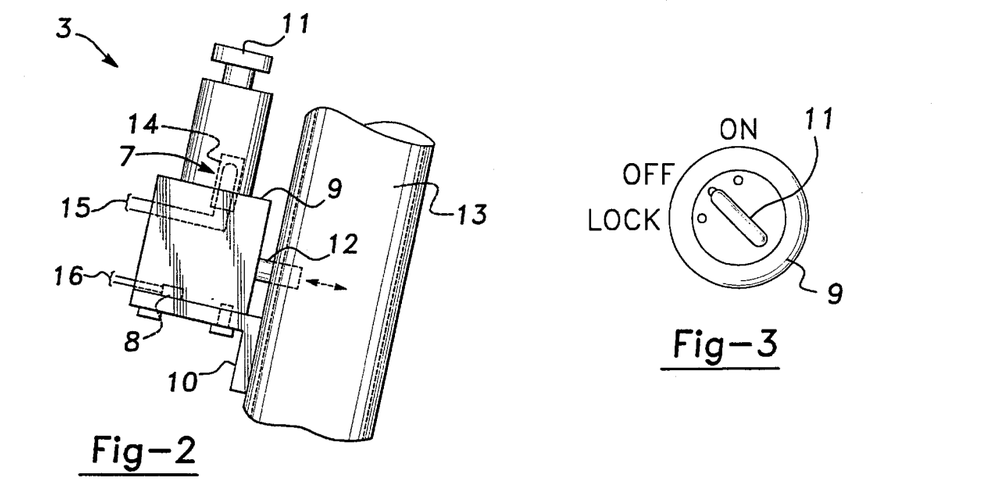
FIG. 2 is a side elevational view illustrating the ignition switch, as mounted to a vehicle steering column portion.
FIG. 3 is a plan view of the ignition switch shown in FIG. 2.

As shown in FIG. 2, ignition switch 3 includes a frame member 9 which is secured to a steering column portion 13 via a plate 10. The ignition switch 3 can occupy any one of positions LOCK, OFF and ON by rotating a key 11 inserted into a rotor (not shown) which is fitted into the top of frame member 9, as illustrated in FIG. 3. The LOCK position generally corresponds to a position at which the key 11 can be pulled out from the ignition switch 3, such as when the vehicle is parked. At this position a locking pin 12, forming a mechanical locking mechanism, is projected into the steering column 13 and meshes with a locking plate (not shown) secured to steering column 13 to prevent the rotation thereof. This locking mechanism has a well known structure and thus no more detail thereof will be herein described. The OFF position of ignition switch 3 is a position at which the vehicle can be moved without starting the engine, and the ON position is a position at which electric current can be supplied and the engine can be started. At the OFF and ON positions, the locking pin 12 does not project into the steering column 13. While the ignition switch shown is of a type typically used for a motorcycle, it will become apparent that an alternate ignition switch configuration for a four wheeled or other type of vehicle, having four or more positions such as LOCK, ACCESSORY, ON and START, could also be readily used in conjunction with the antitheft device of the present invention.

The destruction detecting sensor 7 and the removal detecting sensor 8 are integrally mounted within ignition switch 3. The destruction detecting sensor 7 includes a printed circuit board 14 and a pair of conductors 15 connected to both ends of a circuit pattern formed on board 14. The destruction detecting sensor 7 is configured so as to output an OFF signal, indicative of an "abnormal" condition, via conductors 15 when any of the ignition switch 3, the printed board 14, the printed circuit pattern or the conductors 15 has been broken or removed from ignition switch 3. The removal detecting sensor 8 is preferably formed by a microswitch arranged between frame member 9 and plate 10. Sensor 8 outputs an ON signal, indicative of an "abnormal" condition, via conductors 16 when the ignition switch 3 has been removed from the plate 10.

Figure 4:
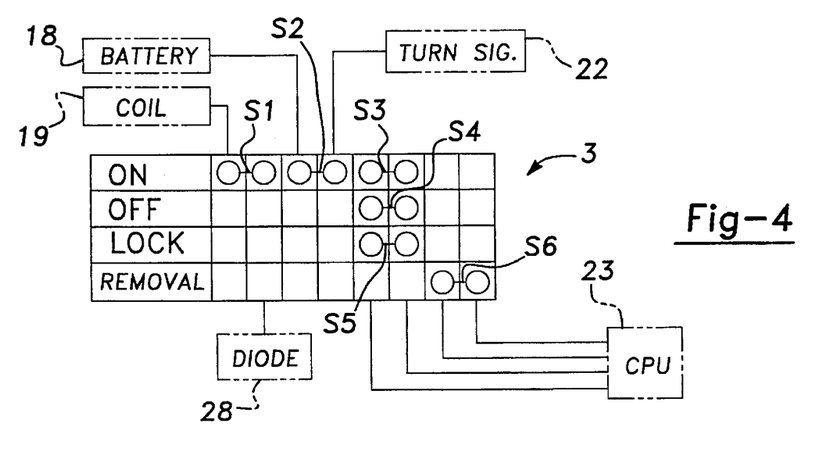
FIG. 4 is a diagrammatic representation of the functional arrangement of contacts of the ignition switch of FIG. 2.

FIG. 4 illustrates a preferred arrangement of contacts forming sensors 7 and 8 in ignition switch 3. At the ON position, it is shown that a charging coil 19 and a diode 28, which will be hereinafter described, are connected via a contact S1, a battery 18 and turn-signal 22 are connected via a contact S2 and a pair of terminals of a Central Processing Unit (CPU) 23 are connected via a contact S3. Similar connections are made at the OFF and LOCK positions and thus the ignition switch 3 has a total of six contacts S1–S6. Of these contacts, contacts S3–S5 are included in destruction detecting sensor 7 and contact S6 is included in removal detecting sensor 8.

Referring back to FIG. 1, power supply 2 for the present antitheft device 1 includes a magneto 21, a battery 18, a charging coil 19 and a pulser coil 20. Rotation of the magneto 21 causes charging coil 19 and pulser coil 20 to generate a predetermined AC voltage and a sequence of pulses. Similarly, antitheft unit 5 includes CPU 23, preferably a 4-bit microcomputer, an input device 24, a power supply 26, a relay 27 and a diode 28. Antitheft unit 5 also includes a holding circuit 25 which, in accordance with an output signal from CPU 23, controls certain portions of ignition device 4, in this preferred embodiment the Capacitive Discharge Ignition (CDI) 38 and an ignition coil 39.

Figure 5:
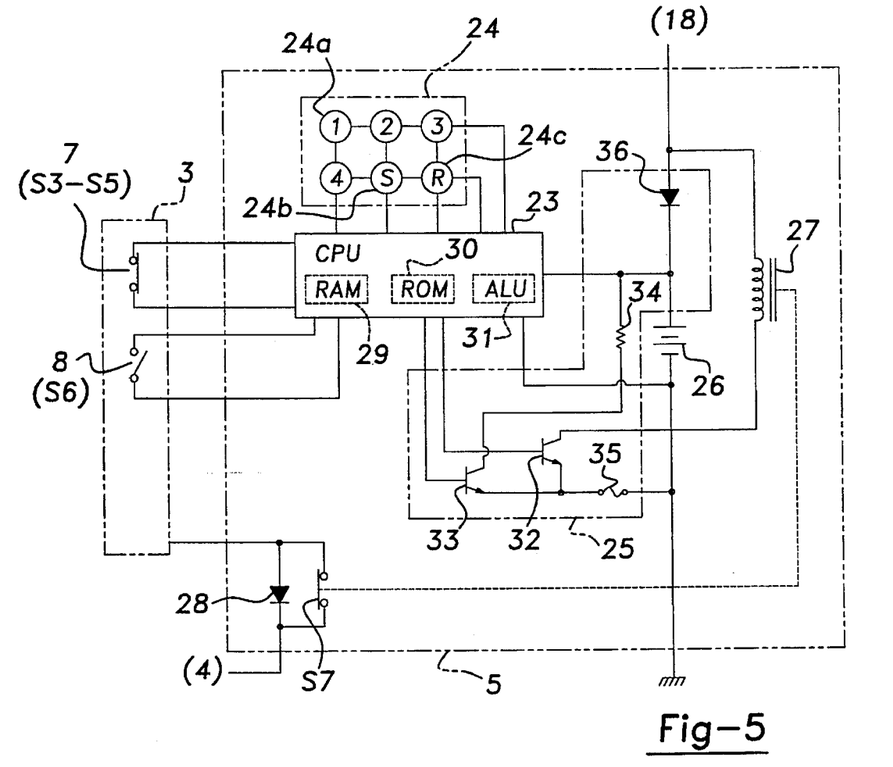
FIG. 5 is a circuit diagram Illustrating one form of the antitheft unit of the invention.

As shown in FIG. 5, CPU 23 includes a data memory (random access memory or RAM) 29, a program memory (read only memory or ROM) 30 and a logic circuit (arithmetic logic unit or ALU) 31. CPU 23 controls holding circuit 25 in accordance with an identification (ID) number input from an input device 24 in combination with signals provided by sensors 7 and 8. The input device 24 preferably includes four numbered keys 24a, having numbers 1–4, a "set" key 24b and a "reset" key 24c and is operated in a commonly known manner.

Holding circuit 25 includes a pair of transistors 32 and 33, the bases of which are connected to output terminals of CPU 23. The collector of transistor 32 is connected to a coil of a relay 27 and the collector of transistor 33 is connected via a resistor 34 to the anode of a power supply 26, preferably a self-contained battery. The emitter of transistor 32 is connected to the emitter of transistor 33 and a fuse 35 is connected between the emitters of transistors 32 and 33 and ground. Fuse 35 may alternately be replaced with any other suitable electronic part, such as a transistor or fuse resistor, which can be readily disabled by an electric current which exceeds a predetermined level.

The cathode of a diode 36 is connected to the anode of power supply 26 and the anode of diode 36 is connected to a coil of relay 27, as well as to the anode of battery 18. Power supply 26 ensures power to CPU 23. The anode of diode 28 is connected to the ignition switch 3 and the cathode thereof is connected to the ignition device 4. A break contact S7 of relay 27 is connected in parallel to diode 28.

Figure 6:
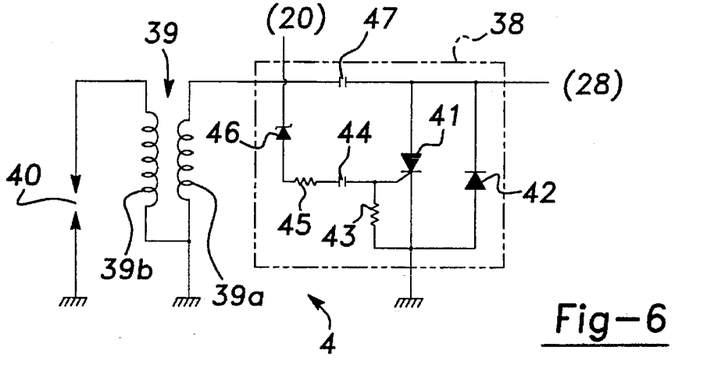
FIG. 6 is a circuit diagram illustrating one form of the ignition device of the invention.

As shown in FIGS. 1 and 6, ignition device 4 in this exemplary embodiment includes CDI unit 38, an ignition coil 39 having a primary coil 39a and a secondary coil 39b and a spark plug 40. The CDI unit 38 includes a thyristor 41, the anode of which is connected to the cathode of diode 28. A diode 42 for protecting thyristor 41 is connected to the anode and cathode of the thyristor 41 in a reversed polarity therewith. A resistor 43 is connected to the gate and cathode of the thyristor 41. A capacitor 44, a resistor 45 and a Zener diode 46 arranged at a reversed polarity, all of which are connected in series with each other, are connected between the gate of the thyristor 41 and the pulser coil 20 of the power supply 2. An ignition capacitor 47 is connected between the anode of thyristor 41 and ignition coil 39. Thus charging coil 19 and ignition coil 39 are mutually connected via contact S1 of ignition switch 3 diode 28 (or break contact S7) and capacitor 47. One end of each of battery 18, charging coil 19, pulser coil 20, ignition coil 39 and spark plug 40 are grounded.

The operation of the antitheft device of the present invention as discussed above can now be described with reference to the flow chart of FIG. 7. The methodology described via the flow chart is preferably carried out by an appropriate program stored in the program memory (ROM) 30 of CPU 23. By turning ON the power switch of antitheft unit 5, the program is started at oval 100. The program first repeatedly checks at diamond 101 for the input of an ID number from input device 24 until an ID number has been input. Once an ID number has been input, the program determines at diamond 102 whether or not the input ID number has been previously stored in CPU 23. If the input ID number has not been previously stored in the CPU 23, the input ID number is subsequently stored by CPU 23 at block 105. A newly input ID number which has not already been stored can occur, for instance, when an ID number is initially input to antitheft unit 5, or when a new ID number is input after the formerly stored ID number has been reset by the operation of reset key 24c of input device 24.

On the other hand, when an input ID number has already been stored by CPU 23, thereby satisfying the condition of diamond 102, whether the input ID number corresponds to the stored ID number is checked in diamond 103. When the input ID number does not correspond to the stored ID number, the stored ID number is deleted at block 104 and the ID number input in step 101 is stored at block 105. Thus, in steps 103–105, when a newly input ID number is different from the already stored ID number, the newly input ID number is stored.

After the ID number has been stored, the antitheft unit 5 is turned to an electrically unlocked condition at block 106. This unlocked condition of the antitheft unit 5 corresponds to a condition wherein the vehicle's engine can be started. The antitheft unit 5 and the ignition device 4 then may operate as follows. Referring back to FIGS. 5 and 6, CPU 23 outputs a signal to the base of transistor 32 of holding circuit 25 and turns transistor 32 ON in order to supply electric current from the battery 18 to the coil of a relay 27. Relay 27 is thus turned ON and break contact S7 opened, and accordingly diode 28 can perform a rectifying function. Under this condition, by rotating ignition switch 3 to the ON position and then by pushing a starting button to rotate magneto 21, charging coil 19 generates a voltage which is supplied to diode 28 via contact S1 of ignition switch 3. The voltage generated by charging coil 19 is an AC voltage having a frequency corresponding to the number of poles of magneto 21.

The AC voltage supplied to diode 28 is rectified to a DC voltage and capacitor 47 of ignition device 4 is charged to a predetermined voltage. After capacitor 47 has been charged, a pulse is generated in pulser coil 20 at each ignition timing by further rotation of magneto 21. These pulses are rectified by a Zener diode 46 and are then supplied to the gate of the thyristor 41 and accordingly the thyristor 41 is turned ON. The turning ON of the thyristor 41 abruptly discharges the charge stored in capacitor 47 to the primary coil 39a of the ignition coil 39 and a high voltage is thus generated in the secondary coil 39b. This high voltage ignites a spark plug 40 and the vehicle's engine is started. The CPU 23 returns to step 101 and waits for a next ID number input.

When, however, the input ID number corresponds to the previously stored ID number in diamond 103, the antitheft unit 5 is turned to an electrically locked condition at block 107. When the antitheft unit 5 is in this electrically locked condition, the ignition device 4 is in a disabled condition and the antitheft unit 5 operates as follows. CPU 23 stops the output of the signal to the base of transistor 32 thereby turning transistor 32 OFF. Relay 27 is not energized, due to the OFF condition of transistor 32 and break contact S7 is thus closed. Accordingly, the rectifying function of diode 28 is disabled due to a short-circuit between both ends of the diode 28, and ignition device 4 is in a disabled condition.

Figure 7:
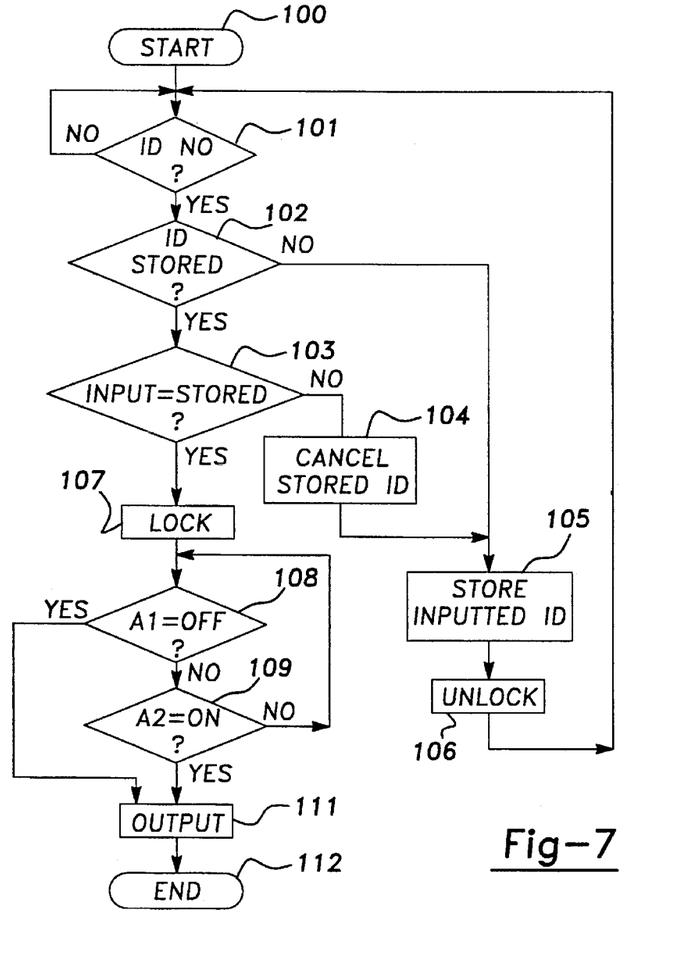
FIG. 7 is a flow chart illustrating an exemplary operation of the antitheft device.

It can be appreciated that the antitheft unit 5 is turned to the electrically locked condition if the same ID numbers are continuously input in steps 101–107 of the flow chart of FIG. 7. Accordingly, the antitheft unit 5 can similarly be turned to the electrically locked condition by inputting an appropriate ID number before driving the vehicle and by re-inputting this ID number after driving the vehicle. The antitheft unit 5 can be turned to the electrically locked condition by continuously inputting the same ID numbers even if the ID number input before driving the vehicle has been forgotten.

When turned to the locked condition in step 107, whether or not a signal A1, received by CPU 23 from destruction detecting sensor 7, is OFF (indicative of an abnormal condition) is determined at diamond 108. When signal A1 is ON, whether or not a signal A2 from removal detecting sensor 8 is ON (also indicative of an abnormal condition) is checked at diamond 109. When signals A1=OFF or A2=ON are output from destruction detecting sensor 7 and removal detecting sensor 8, respectively, such as due to the removal of the switch mechanism 6 or the locking pin 12 by any unauthorized person during a period in which the vehicle has been parked, CPU 23 outputs appropriate signals to a holding circuit 25 at block 111 to drive holding circuit 25 as follows.

The CPU 23 outputs a signal to a base of transistor 33 of holding circuit 25 in order to turn transistor 33 ON. This supplies a predetermined level of electric current from battery 18 to fuse 35 via diode 36, resistor 34 and transistor 33. Fuse 35 is burnt out by this electric current, transistor 32 is turned OFF and relay 27 de-energized. This closes break contact S7 which is connected in parallel with diode 28 and maintains this closed condition. Accordingly, the rectifying function of the diode 28 is disabled, capacitor 47 is not charged and ignition device 4 is maintained in a disabled condition. The program ends at oval 112. This disabled condition of the ignition device 4, such as due to the breakage of the switch mechanism 6 or the locking pin 12, the burning out of fuse 35 and the disability of holding circuit 25, is semi-permanently maintained. Restoration of the ignition circuit can be carried out by turning the antitheft unit 5 to the electrically unlocked condition and by replacing the burnt out fuse 35, or by replacing the whole antitheft unit 5.

Returning to FIG. 7, when neither of the conditions of steps 108 and 109 are satisfied, the program returns to diamond 108. That is, when the antitheft unit 5 is in the electrically locked condition, steps 108–109 are repeated to check if there is any occurrence of an abnormal signal from sensors 7 and 8. The antitheft unit 5 may be turned to the electrically unlocked condition when the key 11 is rotated first to the OFF position and again rotated to the ON position, and a different ID number is entered.

The flow chart of FIG. 7 illustrates only one example of the operation of the antitheft device of the present invention and it can be appreciated that various modifications may be made thereto without departure from the invention. Furthermore, it may be possible to enable the antitheft unit to deal with the situation that the same ID number as that formerly stored is erroneously input during the driving of the vehicle by modifying the antitheft unit electrically unlocked condition when, the antitheft unit so that the flow chart can be carried out when the ignition switch 3 is in either of the LOCK and OFF positions.

According to the first embodiment mentioned above, the antitheft device of the present invention is constructed so that the antitheft unit 5 semi-permanently maintains the ignition device 4 in its disabled condition by burning out the fuse 35 of holding circuit 25 with the input of an abnormal signal from sensors 7 and 8 when the antitheft unit 5 is in the electrically locked condition. Once the antitheft unit 5 is so actuated, it is impossible to operate the ignition device 4 merely by replacing fuse 35 within antitheft unit 5. In order to operate the ignition device 4, it is required to replace fuse 35 and to release the electrically locked condition of the antitheft unit 5 by inputting the correct ID number, or to replace the whole antitheft unit 5.

It is impossible to form a bypass circuit by merely connecting a wire to the broken circuit since the diode 28, which is an important part of the CDI unit 38, is arranged within the antitheft unit 5 and its function is disabled when any abnormality occurs. Restoration of the function of diode 28 can be difficult since the availability of a diode having same specification as that of diode 28 in order to enable the normal operation of the antitheft unit 5 cannot usually be achieved at once.

For these reasons, it can be appreciated that, practically speaking, it is difficult for an unauthorized person to restore the antitheft unit 5 which has been once actuated and therefore the antitheft effect is thereby enhanced. Accordingly, easy restoration of the ignition device 4 can be prevented, for example, by limiting the sale and repair of the antitheft unit 5. Furthermore, it is possible to aid in the recovery of a stolen vehicle equipped with the present antitheft device by storing information such as the time at which fuse 35 burns out, possibly indicative of when the vehicle was stolen, in CPU 23.

Since the present device requires no bulky structure, it is possible to make the device compact and lightweight and to thereby reduce manufacturing costs. Since the antitheft unit 5 can be made compact, it is possible to obtain an antitheft device 1 which can be applied to a wide range of types of vehicles including motorcycles. The compact structure also facilitates sale of the device as an aftermarket accessory.

Figure 8:
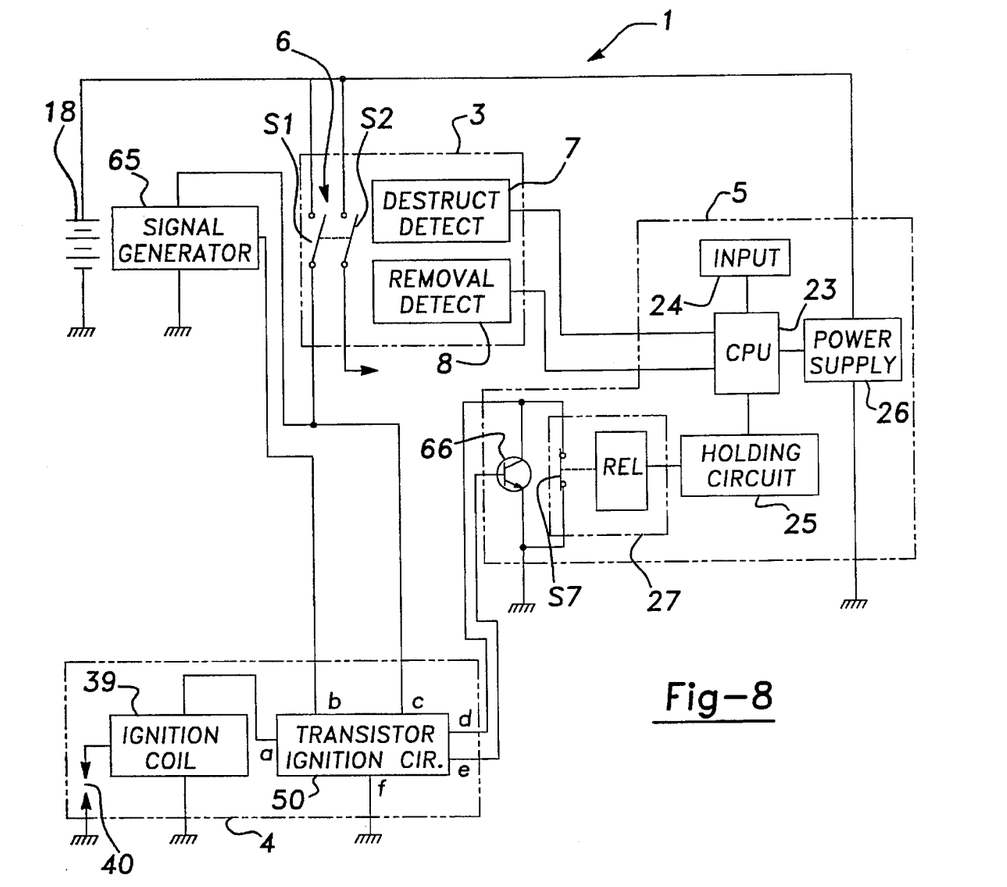
FIG. 8 is a block diagram of a second preferred embodiment of the antitheft device of the present invention.

Although the first embodiment utilizes a CDI unit 38 in the ignition device 4, other electronic components such as a transistor ignition circuit could alternately be used in place of CDI unit 38. A second preferred embodiment of the present invention which uses a transistor ignition circuit will be described with reference to FIGS. 8–12, wherein those elements also used in the first embodiment are designated by like reference numerals. FIG. 8 is a block diagram of the antitheft device 1 in which the ignition 4 includes a transistor ignition circuit 50, the ignition coil 39 and the spark plug 40.

Figure 9:
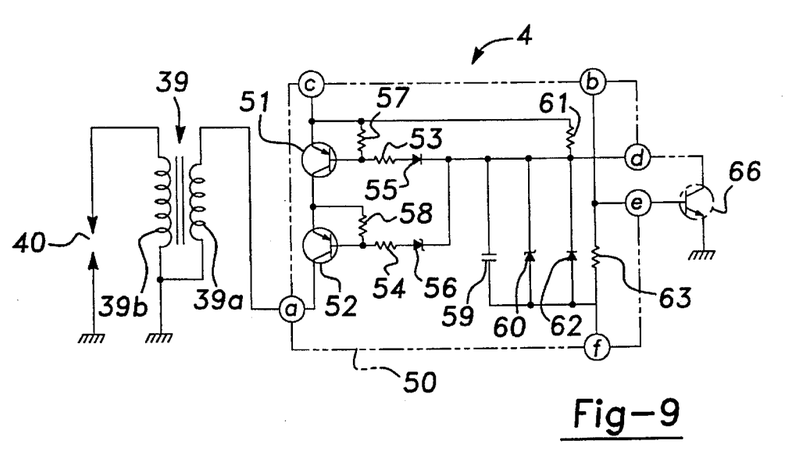
FIG. 9 is a circuit diagram for the ignition device of the embodiment of the antitheft device of FIG. 8.

As shown in FIG. 9, the transistor ignition circuit 50 includes a pair of transistors 51 and 52. Series circuits each including a resistor 53 or 54 and a diode 55 or 56, diode 56 being a Zener diode, are connected to the bases of transistors 51 and 52. Resistors 57 and 58 are connected between the base and emitter of each of transistors 51 and 52. A parallel circuit which includes a capacitor 59 and a Zener diode 60 is connected between diodes 55 and 56 and ground. A series circuit including a resistor 61 and a diode 62 is connected between the emitter of transistor 51 and ground.

The collector terminal (a) of transistor 52 is connected to the primary coil 39a of ignition coil. 39. The emitter terminal (c) of transistor 51 is connected to contact S1 of the ignition switch 3 as shown in FIG. 8. Anode connecting diodes 55 and 56 is connected to the collector of a transistor 66 arranged within antitheft unit 5. The base terminals (b) and (e) of transistor 66 are connected to a signal generator 65 and grounded via a resistor 63.

Figure 10:
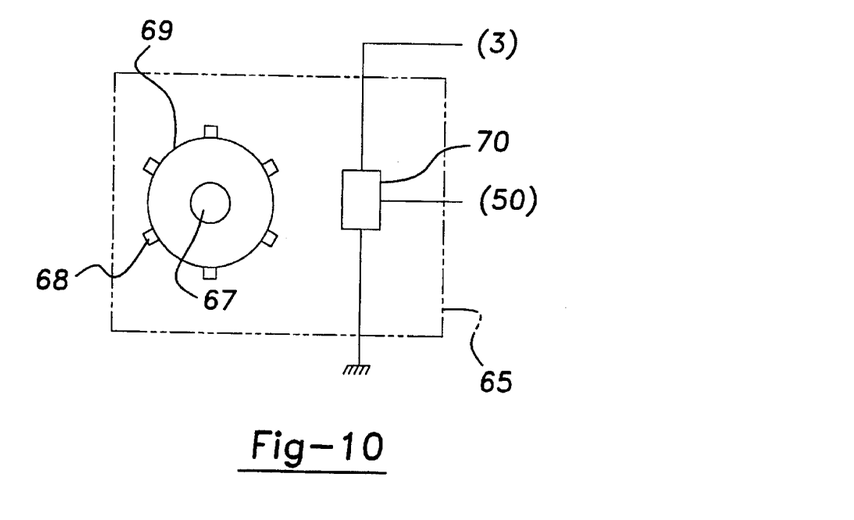
FIG. 10 is a block diagram of the signal generator of the antitheft device of FIG. 8.
Figure 11:
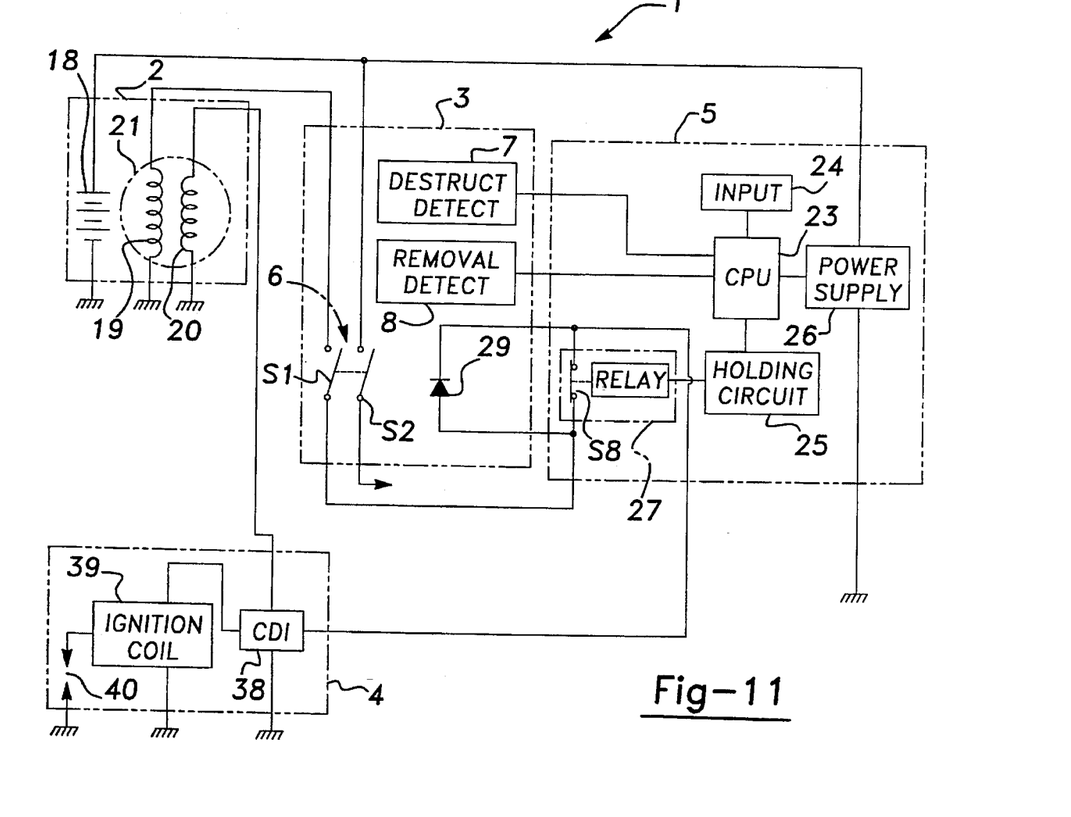
FIG. 11 is a block diagram illustrating a third preferred embodiment of the antitheft device of the present invention.

The break contact S7 of relay 27 is connected between the collector and emitter of transistor 66. Accordingly, the switching function of transistor 66 is normally disabled and is permitted when the break contact S7 is opened by the actuation of relay 27. The signal generator 65 is mounted on a crank shaft 67, as shown in FIG. 10, and includes a timing rotor 69 having magnets 68 arranged at the periphery thereof as well as a Hall effect element 70. Signal generator 65 outputs a predetermined DC voltage signal to the transistor ignition circuit 50. Although the signal generator 65 shown uses the Hall effect element 70, other ignition timing detection device such as a pick-up or a magnetic resistance element could alternately be used.

The operation of the ignition device 4 of this embodiment can be described as follows. When the antitheft unit 5 is turned to the electrically locked condition in step 107, a short circuit between the collector and the emitter of the transistor 66 is formed by break contact S7. The functions of transistor 66 and therefore the transistor ignition circuit 50 are thereby disabled. On the other hand, when the antitheft unit 5 is turned to the electrically unlocked condition, the break contact S7 of the relay 27 is opened and transistor 66 is permitted to operate.

Under this unlocked condition, by turning the ignition switch 3 to the ON position, Hall element 70 is supplied with a voltage and thus ignition device 4 is made operable. By pushing the starting button under this condition, the crank shaft 67 and timing rotor 69 are rotated. Due to the rotation of the timing rotor 69, and thus magnets 68, a magnetic flux variation is created and is detected by Hall element 70 to generate a predetermined DC voltage. This DC voltage is supplied to the base of transistor 66 within antitheft unit 5 via the transistor ignition circuit 50 terminal (e) and turns transistor 66 ON. Turning ON transistor 66 supplies a bias voltage between the emitter and base of transistor 51 to turn the latter ON. By turning ON transistor 51, a bias voltage is supplied between the emitter and base of transistor 52 via transistor 51 and thus transistor 52 is also turned ON. Turning ON both transistors 51 and 52 permits an electric current to flow through the primary coil 39a of ignition coil 39.

Further rotation of timing rotor 69 reduces the magnetic flux and the DC voltage generated in the Hall element is extinguished. The extinguishment of the DC voltage turns transistor 66 OFF. Transistors 51 and 52 are also turned OFF since they are interlocked with the OFF condition of transistor 66. The OFF condition of transistor 52 interrupts the electric current flowing through primary coil 39a of ignition coil 39 and generates a high voltage in secondary coil 39b. The high voltage is discharged at the spark plug 40 and thus the engine is ignited.

In this second embodiment, transistor 66 is a part of the transistor ignition circuit 50 incorporated in antitheft unit 5 and antitheft unit 5 controls the switching function of transistor 66. When any abnormality is caused, antitheft unit 5 disables transistor 66 and prevents the transistor ignition circuit 50 from being operated. Accordingly, in a manner similar to the first embodiment, it is very difficult to restore the antitheft unit 5 after any abnormality has occurred and the antitheft effect is thus enhanced. Especially in this second embodiment using the transistor ignition circuit 50, the replacement of transistor 66 is often more cumbersome than replacement of diode 28 utilized in the first embodiment.

In both embodiments described above, although the break contact is connected in parallel to the diode or transistor, the present invention is not limited thereby and the same effect will be obtained by connecting the make contact of the relay to the diode or transistor in series therewith. Also, although it is shown in both embodiments that only one component such as the CDI unit or the transistor ignition circuit is incorporated in the antitheft unit, a plurality of parts could alternately be incorporated therein.

In addition, although it is shown in both embodiments that the ID number is input by using a key from the input device of the antitheft unit, any other appropriate signal can be input via any other suitable input means such as an ID card. The contact arrangement of the ignition switch, the structures of the destruction detecting sensor and the removal detecting sensor, and the circuit arrangement of the holding circuit can be modified without departing from the scope and spirit of the present invention.

In this regard, a third embodiment of the antitheft device of the present invention is further illustrated in FIGS. 11–15 wherein elements described above In conjunction with the first two embodiments are again designated by like reference numerals. The antitheft device of this third embodiment is fundamentally the same as that shown in FIGURE I of the first embodiment, with one main exception. While the first embodiment included a diode 28 as part of antitheft unit 5, in this third embodiment diode 28 is replaced with a diode 29 which is instead included as part of ignition switch 3.

Figure 12:
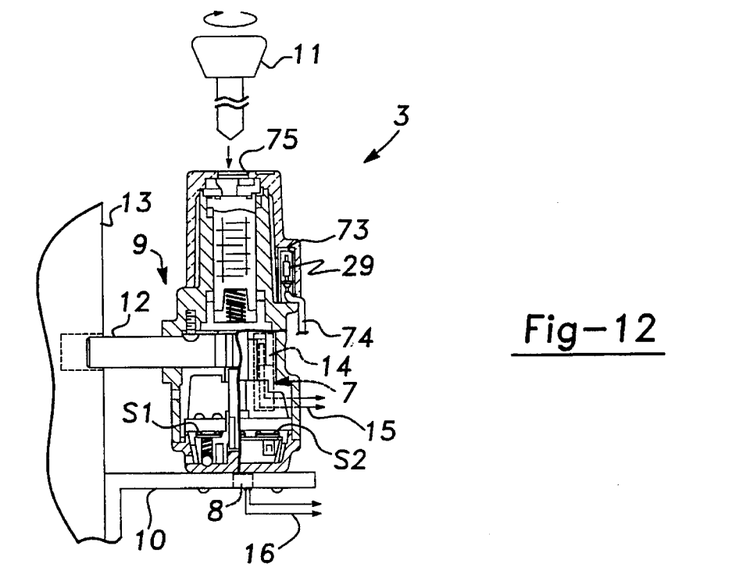
FIG. 12 is a cross-sectional view of the ignition switch of the antitheft device shown in FIG. 11.

This is shown more clearly in FIG. 12 wherein diode 29 is placed in an insulated cavity 73 formed in ignition switch 3 and communicates electrically via a conductor pair 74, which is appropriately insulated. This alternate embodiment makes it even more difficult to reconnect the device and start the vehicle by further hampering access to diode 29 by placing it in a surrounding cavity in the ignition switch. In this regard, the ignition switch housing is preferably made from a strong material, such as a metal, to prevent access to diode 29. Like the ignition switch 3 illustrated in FIG. 2, switch 3 in FIG. 12 likewise includes a printed circuit board 14 which communicates via conductors 15 and removal detection sensor 8 which communicates electrically via conductors 16.

Figure 13:
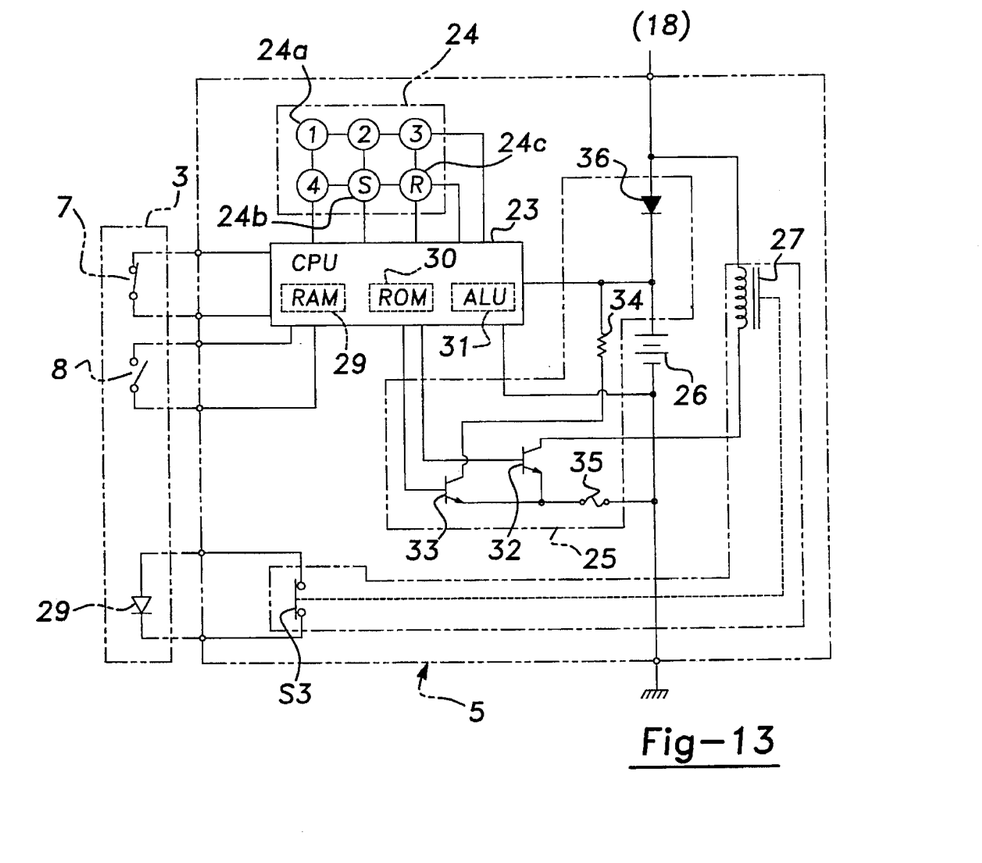
FIG. 13 is a circuit diagram of one form of the antitheft unit of the device of FIG. 11.
Figure 14:
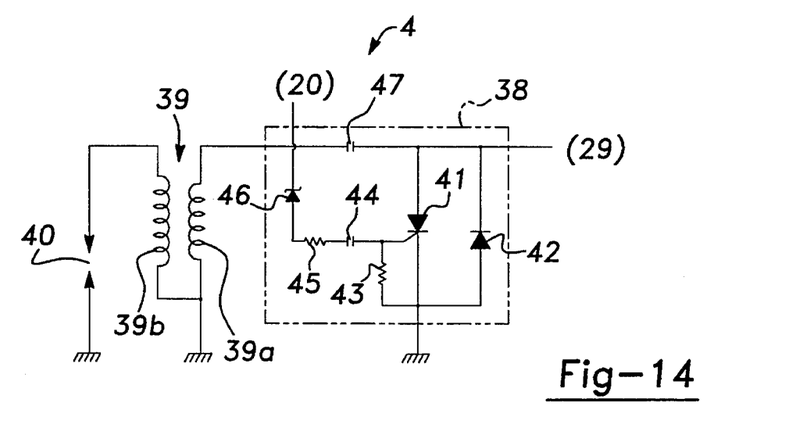
FIG. 14 is a circuit diagram illustrating one form of the ignition device of FIG. 11.
Figure 15:
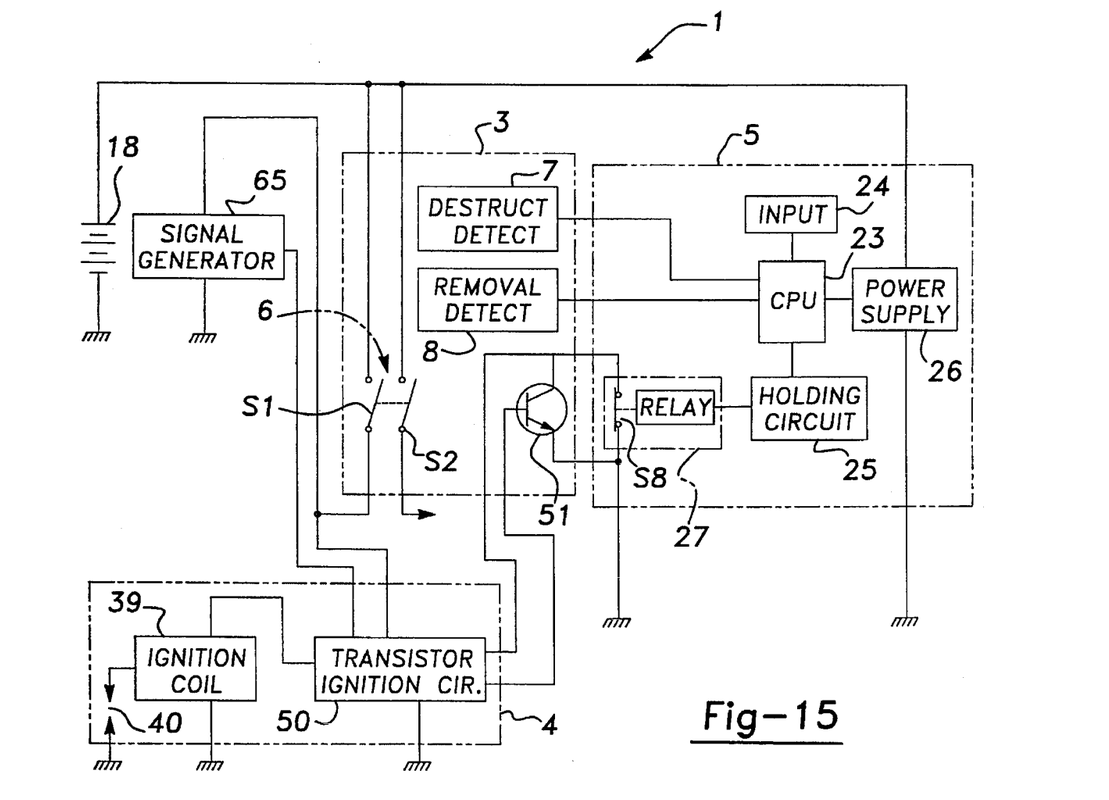
FIG. 15 is a block diagram illustrating use of the antitheft device of FIG. 11 in conjunction with a transistor ignition circuit.

As shown in FIG. 13, the antitheft unit is also similar to that illustrated in FIG. 5 in conjunction with the first embodiment, except that antitheft device 5 no longer includes a disabling diode, with diode 29 instead being part of ignition switch 3. The same is true regarding FIG. 14 which generally corresponds to FIG. 6 of the first embodiment, except that a signal from diode 29 of ignition switch 3 is input to ignition device 4, rather than a signal from diode 28 of antitheft unit 5. Also, like the first embodiment, this third preferred embodiment of the present invention preferably operates in accordance with the steps previously detailed in conjunction with the flow chart of FIG. 7. This third embodiment of the present antitheft device can also be used in conjunction with an ignition system which includes a transistor circuit instead of a CDI unit very much the second embodiment of the present invention discussed above, as illustrated in FIG. 15.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. An antitheft device for a vehicle having an engine ignition device and a power supply for said engine ignition device, comprising:

an ignition switch including switching means for opening and closing a circuit connection between said engine ignition device and said power supply, said ignition switch also including locking means for mechanically inhibiting normal use of said vehicle, and sensor means for detecting an abnormality of at least one of said switching means and said locking means; and an antitheft unit having means for receiving an input signal, means for causing a first disablement condition in response to said input signal wherein at least a part of said engine ignition device is disabled, and means for causing a second disablement condition in response to the detection of said abnormality by said sensor means wherein at least a part of said engine ignition device is disabled, said second disablement condition being different than said first disablement condition, at least one part of said engine ignition device being incorporated into said antitheft unit and said antitheft unit being adapted to make the operation of said engine ignition device substantially impossible by controlling the function of said at least one part of the engine ignition device.

2. The antitheft device according to claim 1, wherein said second disablement condition includes a physical change in a first circuit component of said antitheft unit which requires that said first circuit component be replaced before the functioning of said engine ignition device is capable of being restored.

3. The antitheft device according to claim 2, wherein said second disablement condition further requires the release of said first disablement condition before said second disablement condition can be released.

4. The antitheft device according to claim 2, wherein the physical change of said first circuit component is caused by an electric current which exceeds a predetermined level.

5. The antitheft device according to claim 4, wherein said first circuit component is a fuse.

6. The antitheft device according to claim 1, wherein said first disablement condition includes an electrical bypassing of a second circuit component by a third circuit component.

7. The antitheft device according to claim 6, wherein said second circuit component is a current controlling element, and said third circuit component includes a switching element connected across said current controlling element.

8. The antitheft device according to claim 7, wherein said engine ignition device is a capacitive discharge ignition device, and said current controlling element is a diode which is required to charge a condenser in said capacitive discharge ignition device.

9. The antitheft device according to claim 8, wherein said vehicle is a motorcycle and said locking means inhibits the steering of said motorcycle.

10. The antitheft device according to claim 7, wherein said engine ignition device is a transistor ignition circuit, and said current controlling element is a transistor required by said transistor ignition circuit to operate.

11. The antitheft device according to claim 1, wherein said sensor means senses said abnormality by utilizing a first sensor for detecting a destruction of said switching means, and a second sensor for detecting a removal of said locking means.

12. The antitheft device according to claim 1, wherein said antitheft unit includes a programmed microprocessor which forms part of both said means for causing a first disablement condition and said means for causing a second disablement condition.

13. The antitheft device according to claim 1, wherein said means for receiving an input signal is a keypad and said input signal is an identification code.

14. An antitheft device for a vehicle having an engine ignition device and a power supply for said engine ignition device, comprising:

an ignition switch including switching means for opening and closing a circuit connection between said engine ignition device and said power supply, said ignition switch also including locking means for mechanically inhibiting normal use of said vehicle, and sensor means for detecting an abnormality of at least one of said switching means and said locking means; and an antitheft unit having means for receiving an input signal, means for causing a first disablement condition in response to said input signal wherein at least a part of said engine ignition device is disabled, said first disablement condition includes electrical bypassing of a circuit component which is physically contained in said ignition switch and means for causing a second disablement condition in response to the detection of said abnormality by said sensor means wherein at least a part of said engine ignition device is disabled, said second disablement condition being different than said first disablement condition.

15. The antitheft device according to claim 14, wherein said circuit component is a diode which is physically contained in said ignition switch.

16. The antitheft device according to claim 14 wherein said abnormality includes a destruction of said switching means.

17. The antitheft device according to claim 14, wherein said abnormality includes a removal of said locking means.

18. A method of preventing undesired use of a vehicle having an engine ignition system, an ignition switch and an antitheft unit capable of receiving an input signal, comprising the steps of:

providing both an electrical power connecting component and a mechanical lock for said ignition switch, said mechanical lock being capable of inhibiting normal use of said vehicle;

incorporating at least one part of said engine ignition system into said antitheft unit;

initiating a first disablement condition in response to an input signal in which at least a part of said engine ignition system is disabled by controlling the function of said at least one part of said engine ignition system which is incorporated into said antitheft device; and detecting an abnormality of at least one of said electrical power connecting component and said mechanical lock, and initiating a second disablement condition in response to said detection in which at least a part of said engine ignition system is disabled, said second disablement condition being different from said first disablement condition.

19. The method according to claim 18, wherein said second disablement condition cannot be released until said first disablement condition is released.

20. The method according to claim 19, wherein the release of said second disablement condition requires the replacement of a component which is responsive to an output signal from said antitheft unit.

21. The method according to claim 20, wherein said first disablement condition bypasses said at least one part of said engine ignition system which is incorporated into said antitheft device which is a current controlling element associated with said engine ignition system.

22. The method according to claim 18, wherein the step of detecting an abnormality includes the step of detecting a removal of at least one of said electrical power connecting component and said mechanical lock.

23. The method according to claim 18, wherein the step of detecting an abnormality includes the step of detecting a destruction of at least one of said electrical power connecting component and said mechanical lock.

24. A method of preventing undesired use of a vehicle having an engine ignition system, an ignition switch and a controller capable of receiving an input signal, comprising the steps of:

providing both an electrical power connecting component and a mechanical lock for said ignition switch, said mechanical lock being capable of inhibiting normal use of said vehicle;

initiating a first disablement condition in response to an input signal in which at least a part of said engine ignition system is disabled by bypassing a current controlling element associated with said engine ignition system which is contained in said ignition switch; and detecting an abnormality of at least one of said electrical power connecting component and said mechanical lock, and initiating a second disablement condition in response to said detection in which at least a part of said engine ignition system is disabled said second disablement condition being different from said first disablement condition.

25. The method according to claim 24, wherein the step of detecting an abnormality includes the step of detecting a removal of at least one of said electrical power connecting component and said mechanical lock.

26. The method according to claim 24, wherein the step of detecting an abnormality includes the step of detecting a destruction of at least one of said electrical power connecting component and said mechanical lock.

* * * * *

UNITED STATES PATENT AND TRADEMARK OFFICE
CERTIFICATE OF CORRECTION

PATENT NO. : 5,554,891
DATED : September 10, 1996
INVENTOR(S) : Shimizu, et al

It is certified that error appears in the above-indentified patent and that said Letters Patent is hereby corrected as shown below:

Item [56],
On the Title Page under U.S Patent Documents, reference "4,233,950, "Kroiski, et al" should be --Krolski, et al--.

On the Title Page under U.S. Patent Documents, reference 5,091,586, "5,091,586" should be --5,091,856--.

Signed and Sealed this

Twenty-sixth Day of November 1996

Attest:

BRUCE LEHMAN

Attesting Officer        Commissioner of Patents and Trademarks